Dec. 9, 1952     M. S. ZISKIN ET AL     2,620,948

TEAKETTLE

Filed Feb. 1, 1949

INVENTORS.
MANUEL S. ZISKIN
BY RALPH B. BILLIG

William Isler
ATTORNEY.

Patented Dec. 9, 1952

2,620,948

UNITED STATES PATENT OFFICE 2,620,948

TEAKETTLE

Manuel S. Ziskin, University Heights, and Ralph B. Billig, Erieside, Ohio, assignors to Kromex Corporation, Cleveland, Ohio, a corporation of Ohio Application February 1, 1949, Serial No. 74,005

8 Claims. (Cl. 222—473)

1

This invention relates, as indicated, to a teakettle.

A primary object of the invention is to provide a teakettle which is neat and attractive in appearance, of compact and simple design and construction, and well adapted for normal usage, that is, for the heating or boiling of water for domestic use.

Another object of the invention is to provide a teakettle having a handle of unique and attractive design, a spout closure of unique design, and novel means associated with the handle for raising and lowering the spout closure, such closure-operating means consisting of a minimum number of parts, which are readily accessible to the user of the teakettle.

A further object of the invention is to provide a teakettle of the character described, the component parts of which are of such simple construction, and are so easy to assemble and disassemble, as to permit of manufacture of the teakettle in commercially desirable quantities, and at relatively low cost.

Other objects and advantages of the invention will be apparent during the course of the following description.

In the accompanying drawing, forming a part of this specification, and in which like numerals are employed to designate like parts throughout the same, Fig. 1 is a top plan view of a teakettle embodying the invention;

Figure 1:
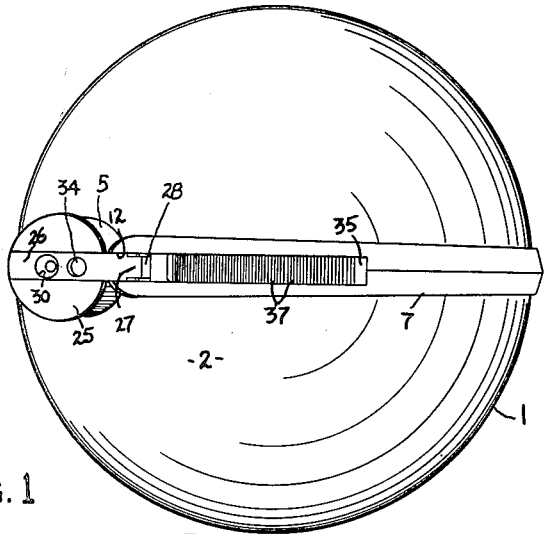
Figure 4:
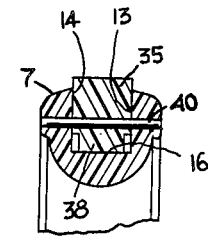
Fig. 4 is a fragmentary cross-sectional view, taken on the line 4—4 of Fig. 2.

Referring more particularly to the drawings, the teakettle will be seen to comprise a sheet metal shell or receptacle having a cylindrical body portion 1, and a top 2 formed integrally with such body portion and of generally dome-shaped contour. The kettle is provided with a bottom 3 which is telescoped into the body 1, and is rigidly secured to the latter, as by a lock-seam 4.

The kettle is also provided with a cylindrical spout 5, which is lock-seamed to the kettle, as at 6, to provide a water-tight connection with the kettle.

The teakettle is further provided with a handle

2

7, preferably molded in one piece from a plastic. This handle is shaped or curved to conform with or generally follow the contour of the top of the kettle, and has a rear foot portion 8 which extends at an inclination to the top of the kettle, and is secured to the latter by means of a screw 9 and stake nut 10, and a front foot portion 11 which extends vertically to the top of the kettle.

The handle is provided in its upper forward portion and foot portion 11 with a central opening or recess 12, which is defined by vertical parallel walls 13 and 14, and a curved rear wall 15, the latter having a depression 16 in the rear end thereof, forming a shoulder or abutment 17. Disposed within the forward portion of the recess 12 is a bracket formed of sheet metal, having a base 18 and parallel sides 19 and 20, the side 19 being in contiguity with the wall 13, and the side 20 being in contiguity with the wall 14. The base 18 is curved to conform with the curvature of the top 2 of the teakettle, and is secured to the latter by means of screws 21 and stake nuts 22. The base 18 is provided with a flange 23 which is curved to conform with the curvature of the front of the handle, and extends vertically to the point 24.

Figure 2:
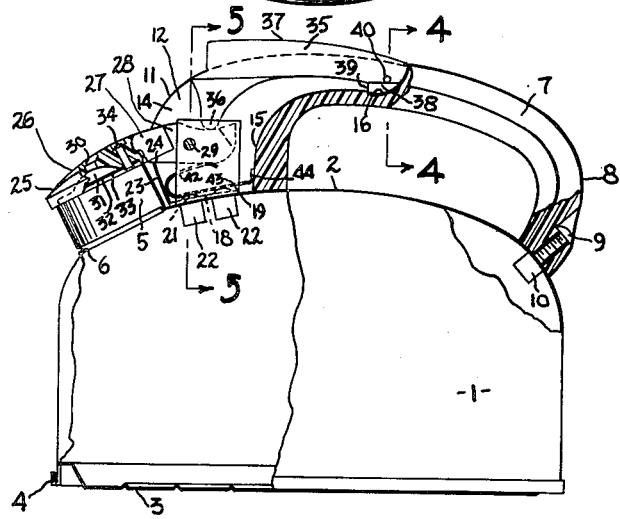
Fig. 2 is a side elevational view of the teakettle, with portions thereof broken away or removed, to show certain details of construction, the spout closure or lid being shown in closed position.
Figure 5:
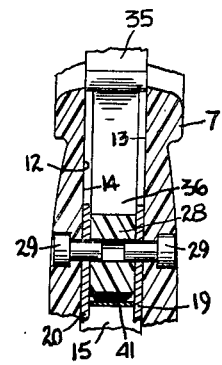
Fig. 5 is a fragmentary cross-sectional view, taken on the line 5—5 of Fig. 2.

The kettle further includes a closure or lid 25 for the spout 5, which closure or lid is preferably molded in one piece from a plastic similar in color to that from which the handle is made. This closure or lid is molded to provide a rib 26 which extends diametrically across the upper surface of the lid and has an extension 27 of a width corresponding to the width of the recess 12 of the handle, and an extension 28 of a reduced width corresponding to the spacing between the sides 19 and 20 of the bracket. The closure or lid 25 normally rests on the upper edge of the spout 5, as shown in Figs. 1 and 2 with the extension 28 thereof extending into the space between the sides 19 and 20 of the bracket, and pivotally secured to the bracket by means of pivot pins 29, which are mounted in the handle 7 and extend through the sides 19 and 20 of the bracket and into the extension 28. The pivot pins 29 thus serve not only as a means of securing the closure or lid to the bracket, but also as a means of securing the handle against displacement from the top 2 of the teakettle.

The closure or lid 25 has a central opening 30 which communicates with an air space 31 within the closure, and is in axial alignment with the central opening 32 of a metallic disc 33, which is secured to the closure below the space 31 by means of a rivet 34. This combination of elements forms a whistle which is actuated in response to steam pressure within the teakettle to indicate that the water therein has attained the proper temperature.

The kettle further includes a closure operator in the form of a lever 35, preferably formed of a plastic of a color different than that of the handle and closure, of a width corresponding to the width of the recess 12 of the handle, and having a downwardly extending toe 36, which normally rests on the extension 28 of the closure or lid 25, as best shown in Fig. 2. The lever also has a serrated ribbed upper surface 37 which facilitates manual actuation of the lever, and has a heel portion 38 at the rear thereof which extends downwardly into the depression 16 of the recess 12, and forms a shoulder or abutment 39. The lever is pivotally secured within the recess 12 by means of a pivot pin 40, the ends of which are mounted in the handle 7, and is normally maintained in the position shown in Figs. 1 and 2 by means of a U-shaped compression spring 41, which is disposed below the extension 28 of the closure or lid 25, one arm 42 of this spring bearing against the lower surface of the extension 28, and the other arm 43 of the spring bearing against the heads of the screws 21. Longitudinal displacement of the spring 41 is prevented by virtue of the engagement of the bight of the spring with the flange 23 of the bracket, and the engagement of a flange 44 on the arm 43 with the rear wall 15 of the recess 12.

The kettle, as thus described, is neat and attractive in appearance, is extremely compact and simple in design and construction, and is admirably adapted for normal usage, that is, for the heating or boiling of water for various purposes.

Figure 3:
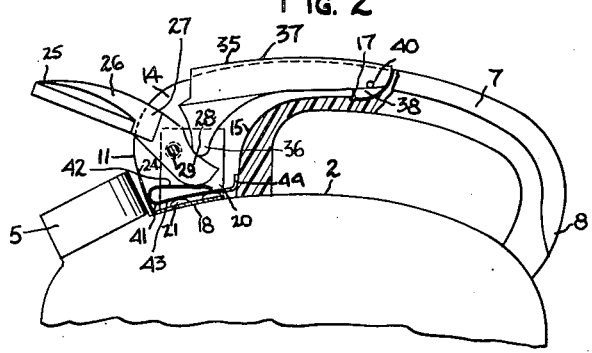
Fig. 3 is a fragmentary view, similar to Fig. 2, but showing the spout closure or lid in open position.

It may be filled with water to the desired depth, the water being introduced through the spout and also dispensed therethrough after being heated. In thus dispensing the water through the spout, the lever 35 is depressed by the thumb of the handle which holds the kettle, from the position shown in Fig. 2 to that shown in Fig. 3. This causes the toe 36 of the lever to slide along the adjacent surface of the extension 28 of the closure 25, thereby rocking the closure to the position shown in Fig. 3. Upon release of the lever 35, the conjoint weight of the closure 25 and action of the spring 41 serves to bring the closure to its closed position. Movement of the lever 35 in a clockwise direction past the position shown in Fig. 2 is prevented by virtue of the engagement of the shoulder or abutment 39 of the handle with the shoulder or abutment 17 of the handle.

It will be apparent that the handle is of unique and attractive design, that the spout closure is of unique design, that the closure operating means consists of a minimum number of parts which are readily accessible to the user of the teakettle, and that the component parts are of simple construction, and are so easy to assemble and disassemble, as to permit of manufacture of the teakettle in commercially desirable quantities, and at relatively low cost.

It is to be understood that the form of our invention, herewith shown and described, is to be taken as a preferred example of the same, and that various changes in the shape, size and arrangement of parts may be resorted to, without departing from the spirit of our invention, or the scope of the subjoined claims.

Having thus described our invention, we claim:

1. A teakettle comprising a receptacle having a cylindrical body portion and a closed top formed integrally with said body portion, a spout extending from said receptacle, a closure for said spout, a handle having a rear foot portion secured to said receptacle and a front foot portion in contiguity with said receptacle, said handle having a recess in said front foot portion, having transversely spaced parallel vertical wall surfaces, a sheet metal bracket disposed in said recess, said bracket having a base and parallel vertical walls in contiguity with the walls of said recess, means securing said base to said receptacle, said spout closure having a rearward extension disposed between said bracket walls, means extending through the handle and through the bracket walls for pivotal mounting of said closure extension, and spring means interposed between said extension and the base of said bracket, operative to normally maintain said closure in closed position, said spring means comprising a U-shaped spring, one arm of which bears against the lower surface of said extension, said bracket provided with a flange which closes a portion of the entrance to said handle recess, and against which the bight of said spring bears.

2. A teakettle, as defined in claim 1, in which said spring is restrained against longitudinal movement by said flange and the rear wall of said recess.

3. A teakettle, as defined in claim 2, in which said recess extends into the upper portion of said handle to form a slot, and a lever is pivotally mounted in said slot and adapted to be depressed by the thumb of the hand which grasps said handle, said closure being elevated upon depression of said lever.

4. A teakettle, as defined in claim 3, in which coacting means are provided on the handle and lever for limiting upward movement of the handle due to the action of said spring.

5. A teakettle, as defined in claim 4, in which said lever has a toe portion disposed in said recess, in engagement with said extension.

6. A teakettle comprising a receptacle having a cylindrical body portion and a closed top formed integrally with said body portion, a spout extending from said receptacle, a closure for said spout, a handle having a rear foot portion secured to said receptacle and a front foot portion in contiguity with said receptacle, said handle having a recess in said front foot portion, said recess having transversely spaced parallel vertical wall surfaces, said front foot portion also having axially aligned openings extending from the outer surface of said handle to said vertical wall surfaces, said openings being counterbored to form shoulders, a sheet metal bracket disposed in said recess, said bracket having a base in contiguity with said closed top and parallel vertical walls in contiguity with the walls of said recess, means securing said base to said receptacle, said spout closure having a rearward extension disposed between said bracket walls, and laterally spaced pins extending through the openings in said handle and through the bracket walls and into said extension for pivotal mounting of said closure extension, said pins having enlarged heads disposed in the counterbored portions of said openings and bearing against said shoulders, whereby the spacing between said pins is maintained, said pins being insertable into the handle and bracket walls from the outer surface of the handle, and removable in like manner.

7. A teakettle, as defined in claim 6, including spring means interposed between said closure extension and the base of said bracket, operative to normally maintain said closure in closed position.

8. A teakettle, as defined in claim 7, in which said spring means comprises a U-shaped spring, one arm of which bears against the lower surface of said closure extension, and the other arm of which bears against said bracket base securing means.

MANUEL S. ZISKIN.
     RALPH B. BILLIG.

REFERENCES CITED

The following references are of record in the file of this patent:

UNITED STATES PATENTS

| Number | Name | Date |
|---|---|---|
| 1,241,511 | Hansen | Oct. 2, 1917 |
| 1,612,410 | Bellvis et al. | Dec. 28, 1926 |
| 2,147,230 | Anschicks | Feb. 14, 1939 |
| 2,432,323 | MacManus | Dec. 9, 1947 |

FOREIGN PATENTS

| Number | Country | Date |
|---|---|---|
| 518,114 | Great Britain | Feb. 19, 1940 |